United States Patent [19]

Honerkamp et al.

[11] 4,455,157
[45] Jun. 19, 1984

[54] ABSORBER FOR DEHYDRATING GAS

[75] Inventors: Joseph D. Honerkamp; Harold O. Ebeling, both of Tulsa, Okla.

[73] Assignee: Latoka Engineering, Inc., Tulsa, Okla.

[21] Appl. No.: 421,568

[22] Filed: Sep. 22, 1982

Related U.S. Application Data

[63] Continuation-in-part of Ser. No. 227,998, Jan. 23, 1981, Pat. No. 4,375,977.

[51] Int. Cl.³ .............................................. B01D 53/20
[52] U.S. Cl. ...................................... 55/234; 55/256; 261/114 A
[58] Field of Search ...................................... 55/29–32, 55/48, 89, 90, 95, 185, 208, 227, 234, 255, 256; 261/114 A, 123

[56] References Cited

U.S. PATENT DOCUMENTS

| | | | |
|---|---|---|---|
| 1,423,696 | 7/1922 | Stevens | 55/227 X |
| 1,865,818 | 7/1932 | Berryman | 261/114 A X |
| 2,070,578 | 2/1937 | Bowman | 55/256 X |
| 2,491,209 | 12/1949 | Rapisarda et al. | 261/114 A |
| 3,097,917 | 7/1963 | Dotts, Jr. et al. | 55/48 |
| 3,322,411 | 5/1967 | Moore | 55/32 X |
| 3,403,522 | 10/1968 | Henry | 55/31 X |
| 3,634,998 | 1/1972 | Patterson | 55/32 |
| 3,648,440 | 3/1972 | Egan | 55/227 X |
| 3,733,782 | 5/1973 | Hatchel | 55/227 X |
| 3,768,234 | 10/1973 | Hardison | 55/227 X |
| 3,780,499 | 12/1973 | Dorr et al. | 55/32 |
| 4,055,403 | 10/1977 | Strauss | 55/31 |

Primary Examiner—Robert H. Spitzer
Attorney, Agent, or Firm—Head, Johnson & Stevenson

[57] ABSTRACT

An improved absorber for extracting water or other liquid contaminants contained in gas including an upright vessel having a gas and a desiccant inlet, a gas outlet adjacent the top and a liquid desiccant outlet adjacent the bottom, a horizontal plate separating the interior of the vessel into an upper and lower chamber, a vertical mixing conduit within the vessel connected at its upper end with the vessel gas and desiccant inlets and passing downwardly through an opening in the plate, the vertical mixing conduit having a mixer element therein which intimately co-mingles the gas and liquid desiccant as they pass into the vessel and downwardly through the mixing conduit into the vessel lower chamber, a plurality of vertical cylindrical members supported in openings in the horizontal plate, the lower end extending below the plate and the upper end extending above the plate, a cap covering the upper portion of each of the cylindrical members, each cap having passageways in the lower edges thereof so that gas and liquid can flow upwardly through the vertical cylindrical members and under the caps and into the vessel upper chamber, packing within the vessel upper chamber, the lower chamber and the lower portion of the upper chamber having the packing therein being filled with liquid desiccant and means of maintaining the level of liquid desiccant and withdrawing the desiccant from the vessel so as to maintain the preselected level, the gas passing out the gas outlet in the upper portion of the vessel and the water in the gas being absorbed by the liquid desiccant and carried out of the vessel with the desiccant.

4 Claims, 4 Drawing Figures

ABSORBER FOR DEHYDRATING GAS

CROSS-REFERENCE TO RELATED APPLICATION

This is a continuation-in-part of Application Ser. No. 227,998, filed Jan. 23, 1981 entitled: "SYSTEM OF DEHYDRATING USING LIQUID DESICCANTS", now U.S. Pat. No. 4,375,977.

BACKGROUND OF THE INVENTION

1. Field of the Invention

This invention relates to apparatus for extracting entrained liquids from gas. Particularly, the invention relates to apparatus for extracting water from gas such as natural gas produced from wells. The invention is further characterized by an improved absorber wherein gas containing entrained water is intimately mixed with a liquid desiccant so that the water contained in the gas is absorbed by the desiccant, the gas thereby being stripped of the entrained water and being separated from the desiccant, the liquid desiccant being recycled and heated wherein the entrained water is driven off so that the desiccant may be repeatedly reused in the absorber.

2. Description of the Prior Art

The use of liquid desiccant as a means of extracting water from gas is well known in the petroleum industry. A variety of different devices have been provided wherein means is afforded for gas having water entrained therein to be contacted by liquid desiccant, such as glycol, so that the water absorbed in the gas is absorbed by the desiccant. The present known devices function satisfactorily; however, they are characterized by lack of efficiency, that is, in order to achieve sufficient intermixing of gas and desiccant so as to absorb substantially all of the water entrained in the gas, the present devices employ relatively large structures usually characterized by tall vertical height with a plurality of trays of desiccant in which the gas passes upwardly therethrough. Tall structures are inherently uneconomical. They can be transported only in a horizontal position, meaning that with the present type of devices it is difficult to prefabricate a unitized water extraction plant for shipment as a unit to a field location. With the present art the customary means of installing systems for dehydrating gas is to ship the individual units to the field location where they are assembled and interconnected with each other. This procedure is obviously more expensive than factory construction of complete gas dehydrating units which can be shipped in preassembled condition ready for use when they reach the field location.

It is therefore an object of this invention to provide an improved absorber vessel in which gas and liquid desiccants are intimately mixed in a vessel of relatively short height and volume and yet wherein the efficiency of the intermixing of the gas and desiccant is equal to or greater than absorber vessels of greater height and volume.

SUMMARY OF THE INVENTION

An absorber for contacting gas having water entrained therein with a liquid desiccant is provided. The absorber is in the form of an upright vessel having a gas inlet and a desiccant inlet, both entering the side of the vessel below the top. At or adjacent to the top of the vessel is a gas outlet, and a liquid desiccant outlet is provided adjacent the vessel bottom. Within the vessel there is a horizontal plate which separates the interior into an upper and lower chamber. A vertical mixing conduit is positioned within the vessel having the lower end thereof connected with an opening in the horizontal plate. The gas inlet and the liquid desiccant inlet are both connected to the vertical mixing conduit which is closed at the top. Gas and liquid desiccant enter the mixing conduit and are mixed together as they flow downwardly within the mixing conduit and are discharged into the vessel lower chamber. To augment mixing within the vertical mixing conduit, a mixing element may be employed therein below the gas and desiccant inlets. A plurality of short vertical length cylindrical members are supported, each in a separate opening in the horizontal plate. The lower end of each of the cylindrical members extends below the plate, and the upper end extends above the plate. A cap is provided to cover the upper portion of each of the cylindrical members. The interior diameter of the caps is greater than the exterior diameter of the cylindrical members, and the caps are provided with passageways below the upper ends of the cylindrical members. Gas flowing upwardly through the cylindrical members flows downwardly in the annular area between the exterior of the cylindrical members and the interior of the caps and out the cap passageways. The liquid desiccant outlet is arranged to maintain a pool of desiccant having a level in the vessel substantially above the cap passageways. Packing is provided within the vessel upper portion, and the packing extends upwardly to a level above the desiccant pool level. Gas entering the mixing conduit flows downwardly with desiccant into the desiccant in the vessel lower chamber and upwardly through the plurality of vertical cylindrical members, under the caps and out through the cap's passageways and then upwardly through the pool of desiccant and the packing to the gas outlet in the upper end of the vessel. The liquid desiccant which absorbs water from the gas is passed out through the desiccant outlet; and in a preferred arrangement, is treated, such as by heating, to remove the entrained water, and recycled.

DESCRIPTION OF THE VIEWS

DETAILED DESCRIPTION

Figure 1:
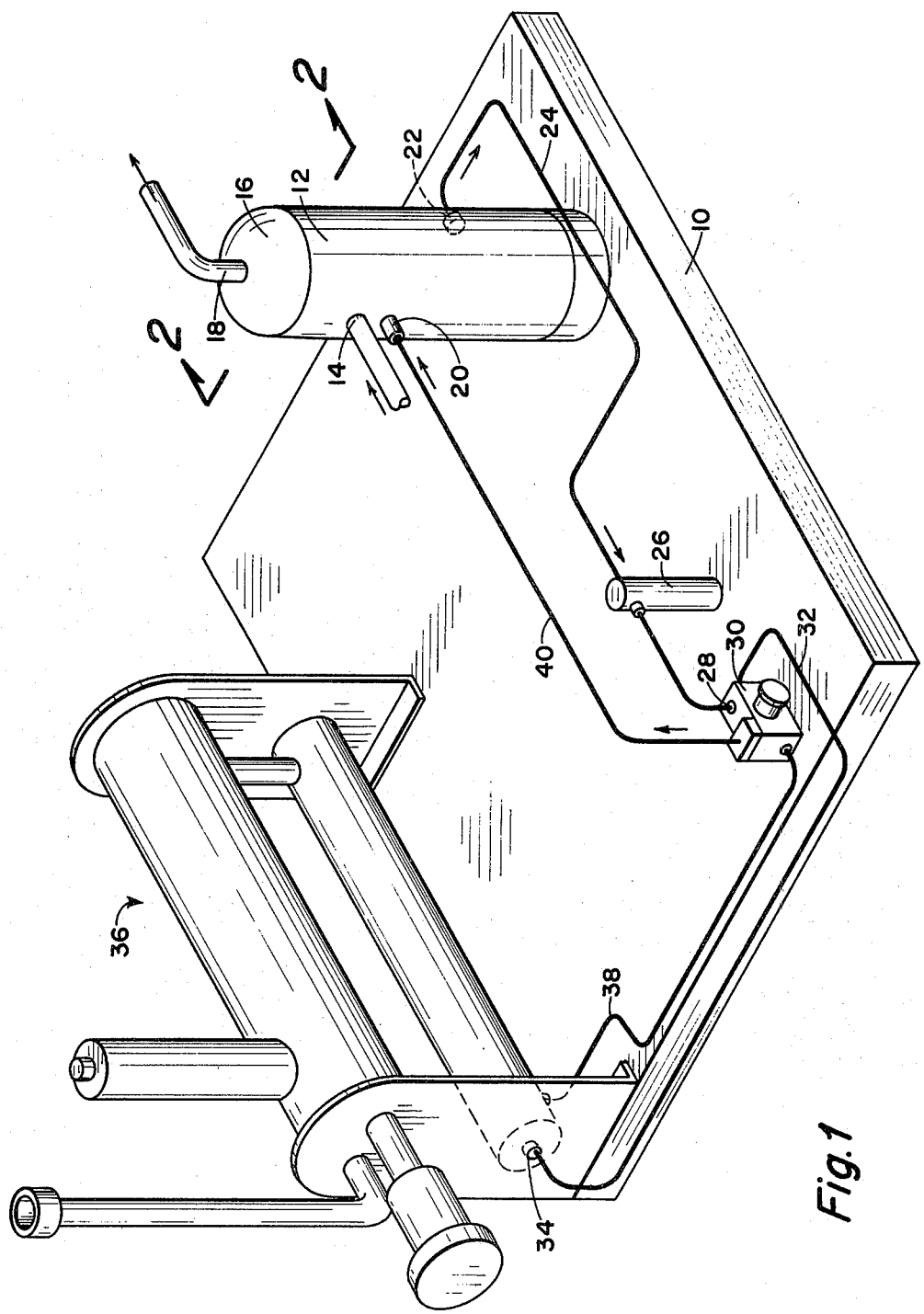
FIG. 1 is an isometric view of a dehydration unit which employs the invention.

Referring to the drawings, and first to FIG. 1, a dehydration unit which employs the principle of this invention is illustrated. A base 10 is shown on which the elements of the device are supported and is illustrative of the manner in which the invention may be employed in which the dehydration unit may be manufactured in assembled condition and shipped to the field for use without requiring field assembly. However, it is understood that this is by way of illustrating only one application of the invention as the absorber which will be described herein may be of any size or capacity and may be manufactured and shipped for field installation according to the present common practice. Mounted on the base 10 is an absorber vessel 12 which is the essence of the present invention and which will be described in detail subsequently. A gas inlet 14 provides means by which gas having water entrained therein is delivered into the vessel. The gas inlet 14 may be connected such as to receive gas from a producing natural gas well or a number of wells connected together as is a common practice in the petroleum industry. Extending from the vessel top 16 is a gas outlet 18 which may connect to a pipeline by way of a metering system so that the gas may be delivered for transportation to ultimate consumers. The function of the absorber 12 is to treat the gas to remove entrained water so that the gas flowing out the outlet 18 is substantially dry.

Vessel 16 has a liquid desiccant inlet 20 and a liquid desiccant outlet 22. Desiccant employed in the petroleum industry may be of a variety of types; however, glycol is the most commonly employed reagent. Glycol has advantages over most other reagents in that it is relatively inexpensive and can absorb a significant quantity of water in proportion to its weight. Further, glycol is easily dehydrated for reuse.

Desiccant flowing out of the vessel 12 from desiccant outlet 22 passes by way of a pipe 24 through a filter 26 to the intake 28 of a pump 30. The illustrated type of pump 30 is of a dual channel type having a first inlet 28 which receives desiccant from absorber 12 and passes it by way of a pipe 32 to the intake 34 of a desiccant regenerator, generally indicated by the numeral 36. Within the regenerator 36 entrained water is removed. When glycol is used as a desiccant this is generally accomplished by heating the glycol so that the absorbed water is evaporated. This is easily accomplished since water has a lower boiling point than glycol and is converted to steam and evaporated from the glycol, leaving the glycol substantially free of water so as to be in condition for reuse to absorb water from gas. In any event, the dehydrated desiccant returns from the regenerator 36 by pipe 38 to pump 30 where it is moved through pipe 40 to the absorber desiccant inlet 20. Thus the liquid desiccant is circulated in the loop from the vessel 12 through pump 30, to regenerator 36, and back to the pump, and thence back to the absorber 12.

Figure 2:
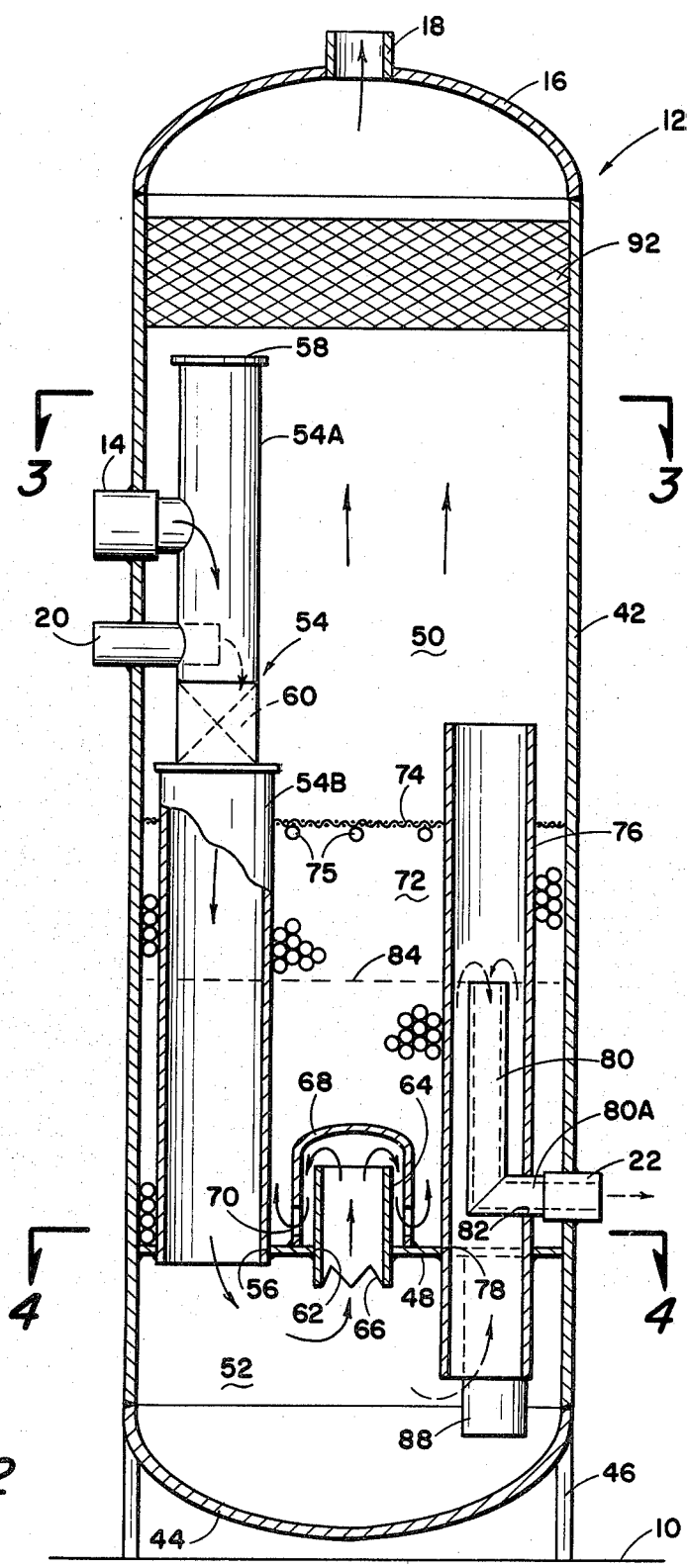
FIG. 2 is a cross-sectional view of the absorber vessel as used in the invention as taken along the lines 2—2 of FIG. 1.
Figure 3:
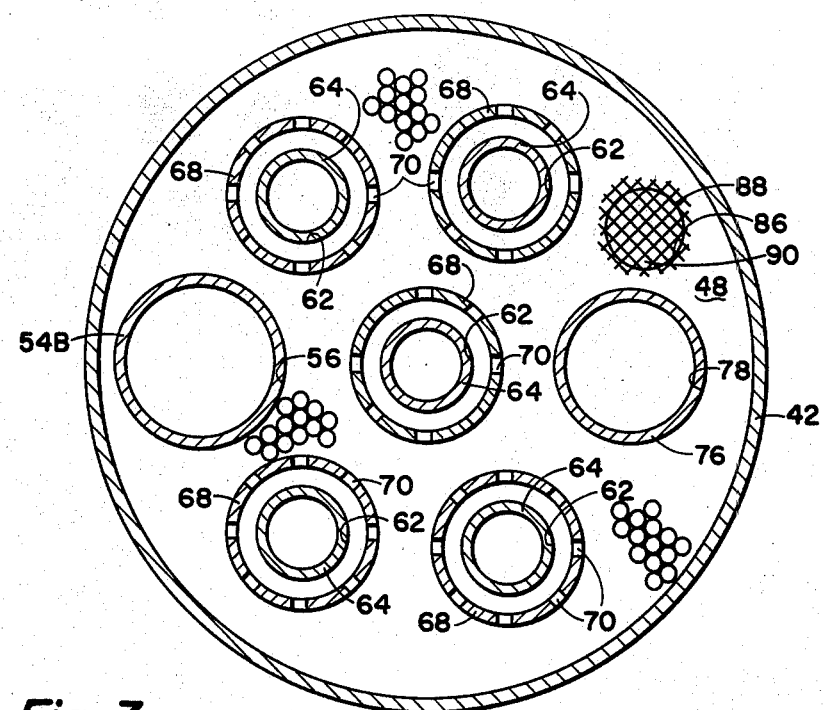
FIG. 3 is a cross-sectional view of the absorber as taken along the line 3—3 of FIG. 2.
Figure 4:
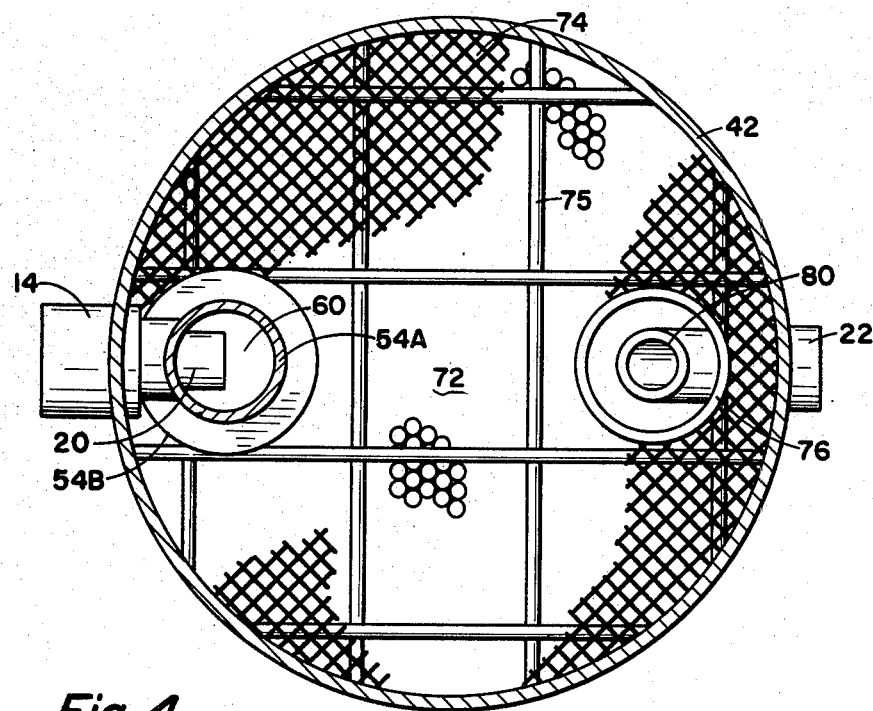
FIG. 4 is another cross-sectional view of the absorber taken along the line 4—4 of FIG. 2.

Turning now to FIGS. 2, 3, and 4, the details of construction of the absorber vessel 12 will be described. The vessel 12 is illustrated as being of a vertical cylindrical arrangement having a cylindrical sidewall 42 which has the gas inlet 14 and desiccant inlet 20 therein. The bottom 44 of the vessel is closed and is supported above the base 10 by a support structure 46.

Within the vessel there is a horizontal plate 48 which divides the vessel interior into an upper portion 50 and a lower portion 52.

Extending upwardly within the vessel is a vertical mixing conduit 54 having an upper portion 54A and a lower portion 54B. The lower portion connects with an opening 56 in horizontal plate 48 so that the bottom of the mixing conduit communicates with the vessel lower portion 52. The mixing conduit upper portion 54 receives connection with the gas inlet 14 and liquid desiccant inlet 20. Thus gas and liquid desiccant both pass into the mixing conduit. The upper end of the mixing conduit which is closed by the top plate 58. The liquid desiccant and gas flow downwardly together within the vertical mixing conduit and enter into the vessel lower portion 52. In the process of flowing downwardly together, the gas and desiccant are mixed. To augment this mixing step, a mixing element 60 is positioned with the interior of the vertical mixing conduit upper portion 54A. The mixing element 60 may be in the form of a commercially available product known as a static mixer, such as Koch mixture. However, several other brands are commercially available. This type mixer typically includes thin metal plates which are twisted and interwoven together to create a large surface area through which the gas and desiccant pass so as to cause them to intimately intermix.

As previously indicated, the vertical mixing conduit 54 has a larger internal diameter lower portion 54B below the mixing element 60. The purpose of providing a larger internal diameter portion is to reduce the velocity of the gas flow as it passes downwardly and into the interior of the vessel lower portion 52. This reduced gas velocity diminishes agitation of the liquid desiccant contained in the lower chamber 52.

Plate 48 has a plurality of additional smaller diameter openings 62 (five being shown in FIG. 3), each of which receives a short length vertical cylindrical member 64. The lower end of each of the cylindrical members 64 extends below the plate 48 and preferably is configured, as shown, wherein the lower edge is defined by a series of notches 66. Welded to the upper surface of plate 48 over each of the cylindrical member 64 is a cap 68. The interior diameter of each of the caps 68 is greater than the exterior diameter of the cylindrical members 64, and the caps have, adjacent their lower edge, a series of passageways 70, the passageways being below the upper ends of the cylindrical members 64.

Filling the lower portion of the vessel upper chamber 50 is a layer of packing 72, the packing surrounding the caps 68. Packing 72 may include pull rings, saddles, ceramic bulls, or any other type of a wide variety of materials commonly employed for such purpose. To retain the thick layer of packing 72 in position, a screen 74 is secured within the interior of the vessel. To support screen 74 a grid of metal bars 75 is welded to the interior of the vessel cylindrical sidewall 42. The function of packing 72 is to provide a large surface area so that gas passing upwardly through the packing thoroughly contacts desiccant so that substantially all of the liquid content of the gas is absorbed.

A vertical desiccant discharge conduit 76 is received in an opening 78 in plate 48. The desiccant discharge conduit extends from near the bottom of the vessel within the lower chamber 52 into the vessel upper chamber 50 above screen 74 and is open at each end. Centrally positioned within the desiccant discharge conduit 76 is a glycol outlet conduit 80 which has a horizontal portion 80A extending through an opening 82 in the sidewall of conduit 76. The glycol outlet conduit horizontal portion 80A communicates with the vessel glycol outlet 22. The open upper end of the desiccant outlet conduit 80 establishes the height of desiccant within the vessel, the level of the desiccant being indicated by the numeral 84.

An opening 86 in plate 48 receives a downwardly extending desiccant equalization conduit 88, the lower end of which is adjacent the vessel bottom and below the lower end of glycol discharge conduit 76. A screen 90 is placed over the top of the conduit 88 (See FIG. 3) so as to retain packing 72 in position above plate 48.

Positioned in the upper end of the vessel 12 is mist extracting packing 92 which intercepts any small droplets of liquid desiccant carried upwardly by the gas stream. As the droplets accumulate in size, they eventually fall downwardly from the mist extractor and onto screen 74 where they pass downwardly into the packing. The gas which is essentially dry, having all the water therein absorbed by the desiccant, passes out the top of vessel 12 through gas outlet 18.

The method of operation of the absorber vessel 12 will now be described. Gas flows through inlet 14 and fresh desiccant flows through inlet 20 into the interior of mixing conduit upper portion 54A and downwardly through mixing element 60 into the mixing conduit lower portion 54B. The flow velocity decreases in this larger diameter conduit and the gas and fresh desiccant flows into the vessel lower chamber 52. All of the interior of the vessel 12 below level 84 is filled with liquid desiccant, except where displaced by gas. Gas flowing into the lower chamber 52 passes through notches 66 on the lower end of the plurality of cylindrical members 69. The gas flows upwardly through the cylindrical members and downwardly in the annular area between the exterior of the cylindrical members and the interior of caps 68, and then out through the openings 70 in the caps. Thus the gas thoroughly contacts the pool of desiccant in the lower chamber 52. As the gas flows out of outlets 70 in caps 68, it flows upwardly through the packing 72 in the vessel above plate 48. The lower portion of the packing below level 84 is fully immersed in desiccant. The portion of packing 72 above the level 84 is not immersed in desiccant but is wetted by desiccant carried upwardly by the gas stream. The gas stream emerges through screen 74 into the upper portion 50 of the vessel below the mist extractor 92. As the gas moves upwardly in this large area, it moves at a relatively low rate, permitting any entrained droplets of desiccant to fall out of the gas column and back onto screen 74 and into the packing.

The desiccant passes into the interior of discharge conduit 76 through the lower end thereof and rises upwardly into the upper end of the desiccant outlet conduit 80 where it flows into the conduit and out through desiccant outlet 22.

The arrangement of the absorber vessel as has been described provides a means of thoroughly contacting wet gas with desiccant so as to absorb a high percentage of the entrained water by the desiccant without the use of tall structures as is the common practice in the art. Fresh, anhydrous desiccant is continually mixed with the incoming wet gas in the mixing conduit, and then the gas is passed into a pool of desiccant before it flows upwardly through desiccant soaked packing. All these steps of contacting the incoming gas with desiccant take place without the necessity of elevated structures.

The apparatus of this invention may be used to extract components other than water from gas using liquid reagents other than glycol.

While the invention has been described with a certain degree of particularily, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. An absorber for contacting gas having water entrained therein with liquid desiccant comprising:

an upright vessel having a gas inlet and a liquid desiccant inlet both being intermediate the vessel top and bottom, a gas outlet adjacent the top and a liquid desiccant outlet adjacent the bottom;

a horizontal plate separating the interior of the vessel into an upper and a lower chamber, the plate having a plurality of openings therein;

a vertical mixing conduit within said vessel connecting at its upper end with said gas inlet and said desiccant inlet and passing downwardly through an opening in said plate, into said lower chamber, the vertical mixing conduit having a lower portion and an upper portion, the upper portion receiving said gas and desiccant inlets and the lower portion being of an increased internal diameter whereby the velocity of flow therethrough is diminished to reduce agitation of liquid desiccant in said vessel lower chamber as the gas passes from the vertical mixing conduit into said lower chamber;

a short length vertical cylindrical member supported in each said opening in said plate, the lower end of each extending above said plate;

a cap covering the upper portion of each said cylindrical members, the internal diameter of the caps being greater than the external diameter of the cylindrical members, the caps having passageways therein below the upper ends of the cylindrical members whereby gas flowing upwardly through said cylindrical members flows downwardly in the annular area between the exterior of the cylindrical members and the interior of the caps and out the cap passageways, said vessel liquid desiccant outlet being arranged to maintain a pool of desiccant having a level in said vessel substantially above said cap passageways, said vessel desiccant inlet being above the desiccant level;

packing means within said vessel extending from said plate upwardly to a level above said desiccant pool level;

a vertical discharge conduit within said vessel having an open top and bottom, the conduit being received in an opening in said plate, the bottom of the conduit terminating within said vessel lower chamber above the vessel bottom and the upper end terminating within said vessel upper chamber above said packing;

a vertical pipe positioned concentrically within said desiccant discharge conduit of external diameter less than the internal diameter of said desiccant discharge conduit, the upper open end being below the upper end of the desiccant discharge conduit, the desiccant discharge conduit having an opening in the sidewall thereof;

a horizontal pipe received in said opening in said desiccant discharge conduit, the horizontal pipe being connected at its inner end to the lower end of said vertical pipe and the other end being connected to said vessel desiccant outlet; and whereby gas and liquid desiccant entering said vessel flow downwardly and are mixed in said mixing conduit into said lower chamber, the gas flows upwardly through said plurality of cylindrical members and through said pool of desiccant and out through said cap passageways, thence upwardly through said packing to said gas outlet, and whereby liquid rises from said lower chamber into said vertical discharge chamber and to the level of the upper end of said vertical pipe to thereby equalize pressures with said vessel upper and lower portion, the liquid flowing out through said vertical and horizontal pipes and said vessel desiccant outlet.

2. An absorber according to claim 1 wherein said vertical mixing conduit has a mixer therein below said gas and desiccant inlets, the gas and desiccant passing downwardly therethrough to intimately mix together.

3. An absorber according to claim 1 wherein the lower edge of said cylindrical members is defined by a series of notches through which gas flows in passing from the vessel lower to the upper chamber.

4. An absorber according to claim 1 wherein said horizontal plate has a liquid passageway opening therein and including:
   a tubular member within said vessel lower chamber, the upper end of which is attached to said plate encompassing said desiccant passageway, the lower open end terminating above the vessel bottom.

* * * * *